Patented Sept. 28, 1948

2,450,133

UNITED STATES PATENT OFFICE 2,450,133

PROCESS FOR PREPARING LACTONES

Hugh J. Hagemeyer, Jr., Kingsport, Tenn., assignor to Eastman Kodak Company, Rochester, N. Y., a corporation of New Jersey No Drawing. Application July 12, 1947,
Serial No. 760,700

16 Claims. (Cl. 260—344)

This invention relates to a process for preparing β-lactones, i. e. lactones of β-hydroxycarboxylic acids, from ketenes and aldehydes, ketones, diketones and keto carboxylic esters.

Staudinger first showed that a keto ketene, such as diphenyl ketene, added to aldehydes or ketones to give β-lactones. Ann. 384, 38–135 (1911) and Ann. 380, 243 (1911). Staudinger also showed the addition of diphenyl ketene to unsaturated ketones, and isolated diolefins from the reaction mixture. Ann. 401, 263 (1913).

Aldo ketenes, on the other hand, are relatively unstable as compared with keto ketenes and dimerize rapidly, under ordinary conditions of temperature and pressure. In the absence of a catalyst, aldo ketenes do not condense with carbonyl compounds, but form the dimer instead. With aldehydes, the ketene dimers react to form unsaturated ketones. See Boese, United States Patent 2,108,427, dated February 15, 1938.

Kung in United States Patent 2,356,459, dated August 22, 1944, has shown that ketene ($CH_2=C=O$) reacts with aldehydes or ketones to give β-lactones, in the presence of Friedel-Crafts type of catalysts.

I have now found that, in the presence of at least one metal fluoborate represented by the formula:

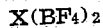

where X is a divalent metal selected from the group consisting of zinc, lead, ferrous iron, nickel, stannous tin, copper and cadmium, ketenes (both aldo and keto ketenes) react with carbonyl compounds selected from the group consisting of aldehydes, ketones, diketones and keto carboxylic esters to give β-lactones.

The catalysts of my process are superior to the Friedel-Crafts type of catalyst, in that the catalysts of my process are not affected by the presence of water. Friedel-Crafts type of catalysts are easily inactivated and destroyed by water, whereas the metal fluoborates can be conveniently employed in the form of a forty to fifty percent solution in water. The metal fluoborate catalysts are particularly advantageous where ketene ($CH_2=C=O$) is prepared by pyrolysis of acetic acid, since water is formed in the pyrolysis and small amounts of water are carried along with the ketene unless especial means are employed to free the ketene from all water. The metal fluoborates are also particularly advantageous in the preparation of the β-lactone of β-hydroxypropionic acid (hydracrylic acid) where paraformaldehyde is used as a source of formaldehyde, because commercial paraformaldehyde contains as high as 5% of water.

It is, accordingly, an object of my invention to provide an improved process for preparing β-lactones. Other objects will become apparent hereinafter.

In accordance with my invention, I prepare β-lactones by reacting a ketene (either an aldo or a keto ketene) with an aldehyde, a ketone, a diketone, or a keto carboxylic ester, in the presence of at least one metal fluoborate represented by the general formula shown above.

The ketenes which are advantageously employed in practicing my invention can be represented by the following general formula:

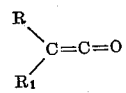

wherein R and $R_1$ each represents a hydrogen atom, an alkyl group (i. e. especially methyl and ethyl groups, i. e. alkyl groups of the formula $C_nH_{2n+1}$ wherein $n$ represents a positive integer of from 1 to 2) or an aryl group (especially a phenyl group, i. e. a $C_6H_5$-group). Although my invention is directed primarily to a process involving ketene ($CH_2=C=O$), any aldo ketene or any keto ketene can be employed. Typical aldo ketenes include ketene, methyl ketene, ethyl ketene, etc. Typical keto ketenes include dimethyl ketene, diethyl ketene, diphenyl ketene, methyl phenyl ketene, etc.

The aldehydes which are advantageously employed in practicing my invention can be represented by the following general formula:

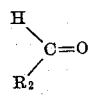

wherein $R_2$ represents an alkyl group (especially methyl, ethyl, isopropyl, n-propyl, n-butyl, isobutyl, secondary butyl and tertiary butyl groups, i. e. an alkyl group of the formula $C_nH_{2n+1}$ wherein $n$ represents a positive integer of from 1 to 4), an aralkyl group (especially benzyl or β-phenylethyl), and an aryl group (especially a monocyclic aryl group of the benzene series, e. g. phenyl, m-tolyl and p-tolyl). My new process is especially useful for the preparation of β-lactones from aldehydes of the above general formula wherein $R_2$ represents a hydrogen atom or a methyl group.

The ketones which are advantageously employed in practicing my invention can be represented by the following general formula:

wherein $R_3$ represents an alkyl group (especially methyl, ethyl, isopropyl, n-propyl, n-butyl, isobutyl, secondary butyl and tertiary butyl groups, i. e. an alkyl group of the formula $C_nH_{2n+1}$ wherein $n$ represents a positive integer of from 1 to 4), an aryl group (especially a monocyclic aryl group of the benzene series, e. g. phenyl, m-tolyl and p-tolyl), or an aralkyl group (especially benzyl and $\beta$-phenylethyl), and $R_4$ represents an alkyl group (especially methyl and ethyl groups) an aryl group (especially a monocyclic aryl group of the benzene series, e. g. phenyl, m-tolyl and p-tolyl) or an aralkyl group (especially benzyl and $\beta$-phenylethyl). My new process is especially useful for the preparation of $\beta$-lactones from the above-formulated ketones wherein $R_4$ represents a methyl group.

The diketones which are advantageously employed in practicing my invention can be represented by the following general formula:

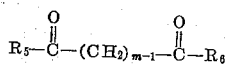

wherein $R_5$ and $R_6$ each represents an alkyl group (especially a methyl, an ethyl, or an n-propyl group) and $m$ represents a positive integer of from 1 to 3.

The keto carboxylic esters which are advantageously employed in practicing my invention can be represented by the following general formula:

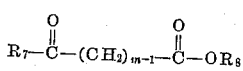

wherein $R_7$ represents an alkyl group (especially methyl and ethyl groups), $R_8$ represents an alkyl group (especially methyl, ethyl, isopropyl, n-propyl, n-butyl, isobutyl and secondary butyl groups) and $m$ represents a positive integer of from 1 to 3.

Typical of the aldehydes, ketones, diketones and keto carboxylic esters are: formaldehyde, acetaldehyde, propionaldehyde, n-butyraldehyde, isobutyraldehyde, phenylacetaldehyde, benzaldehyde, p-methylbenzaldehyde, crotonaldehyde, furfuraldehyde, acetone, ethyl methyl ketone, methyl n-propyl ketone, methyl isopropyl ketone, methyl n-butyl ketone, methyl isobutyl ketone, diethyl ketone, methyl isopropenyl ketone, acetophenone, methyl benzyl ketone, p-methylacetophenone, diacetyl, dipropionyl, di-n-butyryl, diisobutyryl, acetyl acetone, hexanedione-2,4, methyl pyruvate, ethyl pyruvate, methyl acetoacetate, ethyl acetoacetate, n-propyl acetoacetate, n-butyl acetoacetate, ethyl levulinate, etc.

The quantity of metal fluoborate catalyst employed can be varied and optimum concentrations are usually a function of the reactants employed. Ordinarily a concentration of metal fluoborate equal to from about 0.1 to about 3% by weight of the total (all reactants plus solvent, if any) reaction mixture is advantageously employed. Higher concentrations of catalyst can be employed, although ordinarily there is no advantage in doing so. The metal fluoborates are advantageously employed in aqueous solution, e. g. 40 to 50% (by weight) of metal fluoborate.

Where the carbonyl compound employed is an aldehyde, it is advantageous ordinarily to add the ketene and the aldehyde simultaneously and in equimolecular proportions to the catalyst or to a medium containing the catalyst. Where the carbonyl compound employed is a ketone, diketone or a keto carboxylic ester, the ketene is ordinarily advantageously added to the ketone or keto carboxylic ester containing the catalyst.

Advantageously my new process is carried out in a solvent for the reactants, i. e. an organic liquid which dissolves both the ketene and the aldehyde, ketone, diketone or keto carboxylic ester, and which is relatively inert to the reactants. Suitable solvents include the dialkyl ethers which are liquid at 10° C., e. g. diethyl ether, ethyl isopropyl ether, diisopropyl ether, ethyl n-butyl ether, methyl n-propyl ether, etc., cyclic ethers which are liquid at 10° C., e. g. 1,4-dioxane, chlorinated hydrocarbons which are liquid at 10° C., e. g. chloroform, carbon tetrachloride, ethylidene dichloride, ethylene dichloride, etc., hydrocarbons which are liquid at 10° C., e. g. benzene, toluene, etc.

In the case of the lower aldehydes, such as formaldehyde and acetaldehyde, ketones which are liquid at 10° C. can be employed as solvents because formaldehyde and acetaldehyde react with the ketenes much faster than do the ketones to give $\beta$-lactones in accordance with my process. Acetone and methyl ethyl ketone are advantageously employed as solvents when formaldehyde or acetaldehyde is employed.

The $\beta$-lactones, themselves, are excellent solvents in which my process may be performed, and the lactone so used need not correspond to the lactone being formed. However, for practical purposes, it is desired to produce a relatively pure lactone, and a lactone corresponding to the lactone being formed is used. If the lactone is to be used in the preparation of synthetic resins, polymers, etc., it may be desired to produce a lactone mixture, since such a mixture can be used directly without purification.

The temperature of my process may likewise be varied according to the type of compound being reacted. Care should be taken to avoid too rapid an elevation of temperature, since $\beta$-lactones readily lose carbon dioxide and form unsaturated compounds. The temperature used may be as low as $-40°$ C. or as high as $+50°$ C. However, it is generally preferred to use temperatures within the range of 0° C. to 40° C. Formaldehyde, for example, will react with ketene within the temperature range of 0° C. to 50° C. while acetone reacts at a temperature of from 5° C. to 40° C.

The process of my invention can be carried out batchwise or continuously (e. g. in the continuous manner described in the copending application of Hugh J. Hagemeyer, Jr., and Delmer C. Cooper, Serial No. 660,286, filed April 6, 1946). Where ketene ($CH_2=C=O$) is prepared by the catalytic pyrolysis of acetic acid at reduced pressures, it is advantageous to carry out the process at reduced pressure in a scrubber-type reactor, e. g. ketene and formaldehyde can be reacted at reduced pressure in a scrubber-type reactor (in the manner described in the copending application of Herbert G. Stone, Serial No. 660,285, filed April 6, 1946), using $\beta$-propionolactone as a solvent and a metal fluoborate as a catalyst.

Many of the $\beta$-lactones can be distilled from the reaction mixtures under reduced pressures. However, many of the $\beta$-lactones derived from aldehydes and ketones containing olefinic or acetylenic bonds (e. g. crotonaldehyde, methyl isopropenyl ketone, furfuraldehyde, etc.) and many of the β-lactones derived from keto carboxylic esters and diketones cannot be distilled, even under reduced pressure, without undergoing decarboxylation, i. e. loss of carbon dioxide, to give unsaturated compounds. Even the lower molecular weight β-lactones derived from lower molecular weight aldehydes and ketones, e. g. formaldehyde, acetaldehyde, acetone and ethyl methyl ketone, have a tendency to polymerize when heated. With these lower molecular weight β-lactones, it is advantageous to flash distill (i. e. distill rapidly under a low vacuum, the pump producing the vacuum having a capacity greater than the volume of vapor in the still) the reaction mixture and then to purify further the β-lactone by fractional redistillation under reduced pressure.

The following examples will serve to illustrate further the manner of practicing my invention.

*Example I.—Lactone of β-hydroxypropionic acid (β-propionolactone)*

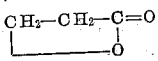

A stainless steel, jacketed reactor, 8 feet high and 2 inches inside diameter, was charged with 12 liters of methyl ethyl ketone in which had been dissolved 30 ml. of a 47.5% aqueous solution of zinc fluoborate. The ketone solution was circulated through the reactor from bottom to top and thence to the bottom through a return line at a rate of 2.2 gals. per minute, the solution being cooled to 0° C. by means of cold glycol circulated through the jacket of the reactor. Ketene at a rate of 4.6 gms. per minute, and formaldehyde at a rate of 3.3 gms. per minute, were mixed immediately before entering the scrubber by means of a nozzle placed just below the screen supporting the packing, the pressure drop across the scrubber being maintained at 32 mm. As the volume of the reactor increased, the liquid overflowed at the top, through a liquid-seal overflow into a line connected with a still.

The uncondensed vapors from the still, along with recovered methyl ethyl ketone, were led back to the reactor, and a partially purified β-propionolactone being attained as a distillate. In an 8-hour run, 1570 gms. of formaldehyde and 2200 gms. of ketene were bled into the reactor. After redistillation of the β-proprionolactone from a hot surface of 80° C. (2 mm. pressure), 2650 gms. of β-propionolactone, B. P. 82–3° C. at 50 mm., $N_D^{20}$ 1.4130, were attained. (70.2% yield.)

*Example II.—Lactone of β-hydroxybutyric acid (β-butyrolactone)*

An acetone solution containing 1% ferrous fluoborate was cooled to a temperature of 0° C. in the manner described in Example I. Gaseous ketene and acetaldehyde were then passed through the solution, the formed β-butyrolactone being withdrawn continuously from the reactor. Over a 16-hour run, 320 grams of ketene and 330 grams of acetaldehyde were added, while the temperature of the reactor was maintained at 0°–10° C. Upon neutralization of the reaction mixture, followed by a distillation under reduced pressure as described above, β-butyrolactone (B. P. 54° C. at 10 mm.) in 64% yield was obtained.

*Example III.—Lactone of β-hydroxyisovaleric acid (β-methyl-β-butyrolactone)*

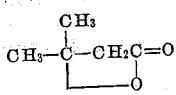

In a manner similar to that described in the above examples, a 1% solution of lead fluoborate in acetone was cooled to 0° C. While maintaining the temperature, by cooling, at 0° to 10° C., a half a mol. (21 gms.) of ketone per hour was passed through the solution, sufficient acetone being added to maintain an equimolar ratio of ketene and acetone in the reactor. The crude reaction mixture was neutralized with a dilute solution of sodium bicarbonate and then flash-distilled at 70° C. under 2 mm. pressure. Redistillation gave a 43% yield of β-methyl-β-butyrolactone B. P. 55° C. at 10 mm., $N_D^{20}$ 1.4126. Titration gave an equivalent weight of 100 (theoretical —100).

*Example IV.—Lactone of β-carboethoxymethyl-β-hydroxybutyric acid*

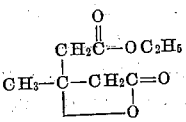

A 1% solution of zinc fluoborate in ethyl acetoacetate was cooled to 0–10° C. While maintaining the temperature by cooling, between 0–10° C., 84 grams of ketene was passed in through a high speed stirrer. The catalyst was neutralized with sodium bicarbonate dissolved in water. (In this example it was preferred to decarboxylate the lactone and isolate the beta, gamma, unsaturated ester decarboxylation product as a measure of the amount of lactone formation.)

The reaction mixture was refluxed at atmospheric pressure until decarboxylation was complete. Decarboxylation temperature, 90–110° C. 160 grams of beta methylene ethyl butyrate, B. P. 20 mm. 54.5° C., $N_D^{20}$ 1.4400 was obtained. Reduction of the unsaturated ester with Raney nickel at 80° C. and 1000 p. s. i. gave a quantitative yield of ethyl isovalerate.

*Example V.—Lactone of β-acetylmethyl-β-hydroxybutyric acid*

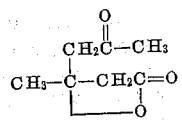

A 2% solution of zinc fluoborate in 300 cc. of acetyl acetone was treated with ketene at 0–10° C. The catalyst was neutralized with sodium bicarbonate in a few cc. of water. Distillation at atmospheric pressure gave a vigorous evolution of $CO_2$ with the base heater at 90–110° C. After one hour at total reflux distillation gave 12 grams of diisopropenyl methane B. P. 735, 88° C., $N_D^{20}$ 1.4399 and 43 grams of 2-methyl penten-1-one-4., B. P. 735, 127° C. $N_D^{20}$ 1.4412.

*Example VI.—Lactone of β-hydroxy-4-hexenoic acid*

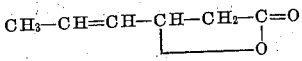

200 grams of crotonaldehyde is added dropwise to a 1% solution of zinc fluoborate in 400 cc. of diisopropyl ether at —10° C. Two moles of ketene are passed in through a high speed stirrer over a period of four hours. The catalyst is neutralized with sodium acetate and the solvent and unchanged crotonaldehyde are removed at 40 mm. The residue is decarboxylated and distilled to give six grams of isoprene and 42 grams of piperylene, B. P. 740, 41.4° C.

This corresponds to a 5% conversion to the δ-lactone and a 35% conversion to the β-lactone. In examples IV, V, and VI, decarboxylation of the products therefrom were used as a measure of the lactone formation.

Other carbonyl-containing compounds may be used in my process to advantage. For example, when ketene is passed into butyraldehyde in which has been dissolved stannous fluoborate, β-capro-lactone having the formula:

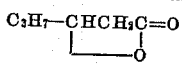

is obtained in excellent yield (65–70%). Also if the acetone of Example III is replaced by acetophenone, the lactone of β-hydroxy-β-phenylbutyric acid of the formula:

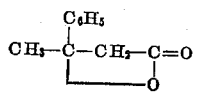

is attained in 60% yield. Similarly, when furfuraldehyde replaces the acetaldehyde of Example II, the lactone of β-(2-furyl)-β-hydroxypropionic acid having the formula:

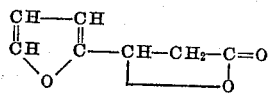

is obtained in excellent yield. Other carbonyl-containing compounds such at methyl acetoacetate, ethyl levulinate, biacetyl, etc., may likewise be used.

What I claim as my invention and desire to be secured by Letters Patent of the United States is:

1. A process for preparing β-lactones comprising reacting at a temperature of below 50° C. and not less than −50° C., a ketene selected from the ketenes represented by the following general formula:

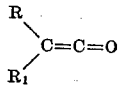

wherein R and R₁ each represents a member selected from the group consisting of a hydrogen atom, a methyl group, an ethyl group and a phenyl (C₆H₅—) group, with a carbonyl compound selected from the group represented by the four general formulas:

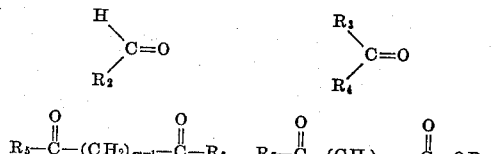

wherein R₂ represents a member selected from the group consisting of a hydrogen atom; an alkyl group having the formula $C_nH_{2n+1}$ wherein $n$ is a positive integer from 1 to 4; a benzyl group; a β-phenylethyl group; and a phenyl group, R₃ and R₄ each represents a member selected from the group consisting of alkyl groups having the formula $C_nH_{2n+1}$ wherein $n$ is a positive integer from 1 to 4; a benzyl group; a β-phenylethyl group; and a phenyl group, R₅, R₆, R₇ and R₈ each represents an alkyl group having the formula $C_nH_{2n+1}$ wherein $n$ is a positive integer from 1 to 4, and $m$ is a positive integer from 1 to 3, in the presence of at least one catalyst selected from the group of metal fluoroborates represented by the following general formula:

$$X(BF_4)_2$$

wherein X represents a divalent metal cation selected from the group consisting of cadmium, copper, iron, nickel, lead, stannous tin and zinc.

2. A process for preparing β-lactones comprising reacting at a temperature of below 50° C. and not less than −50° C., a ketene selected from the ketenes represented by the following general formula:

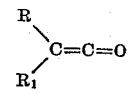

wherein R and R₁ each represents a member selected from the group consisting of a hydrogen atom, a methyl group, an ethyl group and a phenyl (C₆H₅—) group, with a carbonyl compound selected from the group represented by the four general formulas:

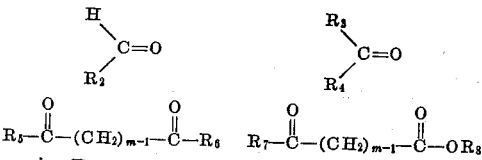

wherein R₂ represents a member selected from the group consisting of a hydrogen atom; an alkyl group having the formula $C_nH_{2n+1}$ wherein $n$ is a positive integer from 1 to 4; a benzyl group; a β-phenylethyl group; and a phenyl group, R₃ and R₄ each represents a member selected from the group consisting of alkyl groups having the formula $C_nH_{2n+1}$ wherein $n$ is a positive integer from 1 to 4; a benzyl group; a β-phenylethyl group; and a phenyl group, R₅, R₆, R₇, and R₈ each represents an alkyl group having the formula $C_nH_{2n+1}$ wherein $n$ is a positive integer from 1 to 4, and $m$ is a positive integer from 1 to 3, in the presence of from 0.1 to 3% by weight, based on the total reaction mixture, of at least one catalyst selected from the group of metal fluoroborates represented by the following general formula:

$$X(BF_4)_2$$

wherein X represents a divalent metal cation selected from the group consisting of cadmium, copper, iron, nickel, lead, stannous tin and zinc.

3. A process for preparing β-lactones comprising reacting at a temperature of below 50° C. and not less than −50° C., a ketene selected from the ketenes represented by the following general formula:

wherein R and R₁ each represents a member selected from the group consisting of a hydrogen atom, a methyl group, an ethyl group and a phenyl (C₆H₅—) group, with a carbonyl compound selected from the group represented by the four general formulas:

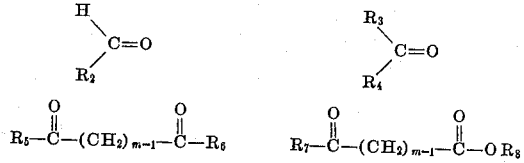

wherein $R_2$ represents a member selected from the group consisting of a hydrogen atom; an alkyl group having the formula $C_nH_{2n+1}$ wherein $n$ is a positive integer from 1 to 4; a benzyl group; a β-phenylethyl group; and a phenyl group, $R_3$ and $R_4$ each represents a member selected from the group consisting of alkyl groups having the formula $C_nH_{2n+1}$ wherein $n$ is a positive integer from 1 to 4; a benzyl group; a β-phenylethyl group; and a phenyl group, $R_5$, $R_6$, $R_7$, and $R_8$ each represents an alkyl group having the formula $C_nH_{2n+1}$ wherein $n$ is a positive integer from 1 to 4, and $m$ is a positive integer from 1 to 3, in the presence of from 0.1 to 3% by weight, based on the total reaction mixture, of at least one catalyst selected from the group of metal fluoroborates represented by the following general formula:

$$X(BF_4)_2$$

wherein X represents a divalent metal cation selected from the group consisting of cadmium, copper, iron, nickel, lead, stannous tin and zinc, in the presence of a solvent selected from the group consisting of acetone, methyl ethyl ketone, and a β-lactone corresponding to the lactone formed in the reaction.

4. A process for preparing a β-lactone comprising reacting, at a temperature of below 50° C. and not less than −50° C., ketene ($CH_2=C=O$) with a carbonyl compound selected from the group represented by the following four general formulas:

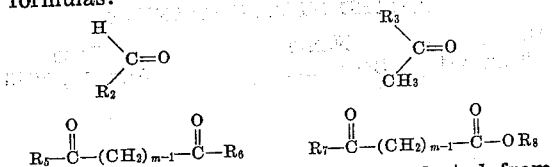

wherein $R_2$ represents a member selected from the group consisting of a hydrogen atom, an alkyl group of the formula $C_nH_{2n+1}$ wherein $n$ represents a positive integer of from 1 to 4, a benzyl group, a β-phenylethyl group and a phenyl ($C_6H_5$—) group, $R_3$ represents a member selected from the group consisting of an alkyl group of the formula $C_nH_{2n+1}$ wherein $n$ represents a positive integer of from 1 to 4, $R_5$ and $R_6$ each represents an alkyl group of the formula $C_nH_{2n+1}$ wherein $n$ represents a positive integer of from 1 to 3, $R_7$ represents an alkyl group selected from the group consisting of methyl and ethyl groups, and $R_8$ represents a member selected from the group consisting of primary and secondary alkyl groups of the formula $C_nH_{2n+1}$ wherein $n$ represents a positive integer of from 1 to 4, and $m$ represents a positive integer of from 1 to 3, in the presence of at least one catalyst selected from the group of metal fluoroborates represented by the following general formula:

$$X(BF_4)_2$$

wherein X represents a divalent metal cation selected from the group consisting of cadmium, copper, iron, nickel, lead, stannous tin and zinc.

5. A process for preparing a β-lactone which comprises reacting at a temperature of from −40° to +50° C. ketene ($CH_2=C=O$) with an aldehyde having the formula:

wherein $R_2$ represents a member selected from the group consisting of hydrogen, an alkyl group having the formula $C_nH_{2n+1}$ where $n$ is a positive integer from 1 to 4, a benzyl group, a β-phenylethyl group, and a phenyl group in the presence of at least one catalyst selected from the group of metal fluoroborates represented by the following general formula:

$$X(BF_4)_2$$

wherein X represents a divalent metal cation selected from the group consisting of cadmium, copper, iron, nickel, lead, stannous tin and zinc.

6. A process for preparing a β-lactone which comprises reacting at a temperature of from −40° to +50° C. ketene ($CH_2=C=O$) with a ketone having the formula:

wherein $R_3$ and $R_4$ each represents a member selected from the group consisting of an alkyl group having the formula $C_nH_{2n+1}$ where $n$ is a positive integer from 1 to 4, a benzyl group, a β-phenylethyl group, and a phenyl group in the presence of at least one catalyst selected from the group of metal fluoroborates represented by the following general formula:

$$X(BF_4)_2$$

wherein X represents a divalent metal cation selected from the group consisting of cadmium, copper, iron, nickel, lead, stannous tin and zinc.

7. A process for preparing β-propionolactone comprising reacting at a temperature of from −40° to +50° C. ketene ($CH_2=C=O$) with formaldehyde in the presence of at least one catalyst selected from the group of metal fluoroborates represented by the following general formula:

$$X(BF_4)_2$$

wherein X represents a divalent metal cation selected from the group consisting of cadmium, copper, iron, nickel, lead, stannous tin and zinc.

8. A process for preparing β-propionolactone comprising reacting ketene ($CH_2=C=O$) with formaldehyde in the presence of from 0.1 to 3% by weight, based on the total reaction mixture, of at least one catalyst selected from the group consisting of metal fluoborates represented by the formula:

$$X(BF)_2$$

wherein X is a bivalent metal catiton selected from the group consisting of cadmium, copper, iron, nickel, lead, stannous tin, and zinc, at a temperature of from −40° to +50° C.

9. A process for preparing β-propionolactone which comprises reacting ketene ($CH_2=C=O$) with formaldehyde in the presence of from 0.1 to 3% by weight, based on the total reaction mixture, of at least one catalyst selected from the group consisting of metal fluoborates represented by the formula:

$$X(BF)_2$$

wherein X is a bivalent metal cation selected from the group consisting of cadmium, copper, iron, nickel, lead, stannous tin, and zinc, at a temperature of 0° to +40° C. in the presence of a solvent for the reactants.

10. A process for preparing β-propionolactone which comprises reacting ketene ($CH_2=C=O$) with formaldehyde in the presence of from 0.1% to 3% by weight, based on the total weight of the reaction mixture, of zinc fluoborate, at a temperature of from −40° to +50° C.

11. A process for preparing β-propionolactone which comprises reacting ketene (CH₂=C=O) with formaldehyde in the presence of from 0.1% to 3% by weight, based on the total weight of the reaction mixture, of zinc fluoborate, at a temperature from 0° to +40° C. in the presence of β-propionolactone as solvent.

12. A process for preparing β-propionolactone which comprises reacting ketene (CH₂=C=O) with formaldehyde in the presence of from 0.1% to 3% by weight, based on the total weight of the reaction mixture, of zinc fluoborate, at a temperature of from 0° to 40° C. in the presence of a solvent selected from the group consisting of acetone, methyl ethyl ketone, and β-propionolactone.

13. A process for preparing β-propionolactone comprising reacting at a temperature of from —40° to +50° C. ketene (CH₂=C=) with formaldehyde in the presence of at least one catalyst selected from the group of metal fluoroborates represented by the following general formula:

$$X(BF_4)_2$$

wherein X represents a divalent metal cation selected from the group consisting of cadmium, copper, iron, nickel, lead, stannous tin and zinc, in the presence of a solvent selected from the group consisting of acetone, methyl ethyl ketone, and β-propionolactone.

14. A process for preparing β-butyrolactone comprising reacting at a temperature of from —40° to +50° C. ketene (CH₂=C=O) with acetaldehyde in the presence of at least one catalyst selected from the group of metal fluoroborates represented by the following general formula:

$$X(BF_4)_2$$

wherein X represents a divalent metal cation selected from the group consisting of cadmium, copper, iron, nickel, lead, stannous tin and zinc.

15. A process for preparing β-butyrolactone comprising reacting ketene (CH₂=C=O) with acetaldehyde in the presence of at least one catalyst selected from the group of metal fluoroborates represented by the following general formula:

$$X(BF_4)_2$$

wherein X represents a divalent metal cation selected from the group consisting of cadmium, copper, iron, nickel, lead, stannous tin and zinc in the presence of a solvent selected from the group consisting of acetone, methyl ethyl ketone, and β-butyrolactone at a temperature of —40° to +50° C.

16. A process for preparing β-butyrolactone comprising reacting ketene (CH₂=C=O) with acetaldehyde in the presence of from 0.1% to 3% by weight, based on the total weight of the reaction mixture, of ferrous fluoborate in the presence of a solvent selected from the group consisting of acetone, methyl ethyl ketone, and β-butyrolactone, at a temperature from —40° to +50° C.

HUGH J. HAGEMEYER, Jr.

REFERENCES CITED

The following references are of record in the file of this patent:

UNITED STATES PATENTS

| Number | Name | Date |
|---|---|---|
| 2,382,464 | Boese | Aug. 14, 1945 |

Certificate of Correction

Patent No. 2,450,133.  September 28, 1948.

HUGH J. HAGEMEYER, Jr.

It is hereby certified that errors appear in the printed specification of the above numbered patent requiring correction as follows:

Column 6, line 12, Example III, for "ketone" read *ketene*; column 7, line 37, for "such at" read *such as*; column 10, line 52, claim 8, for "catiton" read *cation*; column 11, line 19, claim 13, for "$(CH_2=C=)$" read $(CH_2=C=O)$;

and that the said Letters Patent should be read with these corrections therein that the same may conform to the record of the case in the Patent Office.

Signed and sealed this 18th day of January, A. D. 1949.

[SEAL]

THOMAS F. MURPHY,
*Assistant Commissioner of Patents.*